3,539,412
SELECTIVE TEMPERATURE LAMINATION OF DISSIMILAR COMPOSITE PANELS
Phillip A. Miller, Ventura, Calif., assignor to The Sierracin Corporation, Sylmar, Calif., a corporation of California
No Drawing. Filed Feb. 20, 1967, Ser. No. 617,059
Int. Cl. B32b 31/00
U.S. Cl. 156—106                                    11 Claims

ABSTRACT OF THE DISCLOSURE

This patent describes a two-step laminating technique which comprises preparing two sub-laminates, one face of each being of a similar adherable transparent material, and the other face of each being a dissimilar hard transparent material, and then contacting the two faces of the sublaminates having the similar adherable material to cause joining and thus produce a unitary final laminate.

BACKGROUND OF THE INVENTION

The field of this invention pertains to the art of laminating, and more particularly to the art of laminating transparent sheets such as glass and hard plastics with a softer transparent plastic interlayer.

It has been long known that glass or plastic may be utilized for canopies, windows, and the like in aircraft. In general, plastic windows have the advantage of lightweight and excellent shatter-resistance. These qualities are particularly important on military aircraft where protection against gunfire is vital. More generally, shatter-resistance is important in preventing disasters caused by the impact of birds on windows and canopies.

On the other hand, the advantage of glass resides in its excellent abrasion resistance as compared to plastic. Glass is not readily scratched by the action of dust and sand. However, even the best glasses, such as those which are chemically tempered, are relatively heavy and possess relatively inferior shatter-resistance. From what has been said, it can be seen that for many applications, particularly in military aircraft, it would be preferred to use a glass facing surface on an otherwise all-plastic windshield or canopy to thereby combine a hard-wearing scratch-resistant outer surface with a shatter-resistant lightweight inner surface. However, it will be appreciated that the problem of joining dissimilar materials such as glass and plastic, is rather difficult when the materials have relatively high moduli of elasticity and when the difference in coefficient of thermal expansion of glass and the most commonly used plastic (stretched Plexiglas, a polymethylmethacrylate) are noted. Thus, the modulus elasticity of chemically tempered glass is about 11.81 lb./in.$^2 \times 10^6$ as compared to 0.49 lb./in.$^2 \times 10^6$ for stretched Plexiglas. The difference in the coefficient of thermal expansion between the two materials is also substantial, $.92 \times 10^{-5}$ in./in./° F. for chemically tempered glass and $3.3 \times 10^{-5}$ in./in./° F. for stretched Plexiglas.

It has been proposed to join glass and Plexiglas with a polyvinyl butyral interlayer in a single laminating operation. I have found that this procedure does not give good bonding and low residual stress. The factors which are believed to contribute to the difficulty are the dissimilarity in the properties of glass and plastic. Consider first the mechanism of interaction between the glass and Plexiglas layers when a composite part is subjected to a change of temperature. The junction between the glass and the Plexiglas becomes established at the temperature at which the interlayer forms its weld to both faces. Thereafter, at temperatures below this, the glass will be in compression and the Plexiglas will be in tension because of the difference in thermal contractions between the two materials. This type of interaction tends to act unfavorably on the bonding between the Plexiglas and the glass. However, the difference in properties also otherwise affects the performance of the composite. Consider, for example, a composite faced with chemically tempered glass of about 0.1" thickness. If a piece of Plexiglas of about 0.25" is attached to the Plexiglas ply, this composite, upon being subjected to a temperature change, will cause the glass and Plexiglas to work against each other. The amount of interaction forces between the two materials will obviously depend to some extent upon the thickness of the two materials and the extent of the temperature change, but it can be seen that in many situations, if the composite is unrestrained, the interaction forces will cause the composite to take on a bowed shape. The elimination of the bow by edge restraints creates added stresses in the composite materials.

The present invention is therefore concerned with a novel laminating technique for joining dissimilar materials, such as glass and Plexiglas, in such a manner that the forces between materials are minimized, thereby improving the bonding and reducing the tendency of the final composite to assume a bowed configuration.

SUMMARY OF INVENTION

Briefly, the present invention comprises a method of laminating comprising taking two sub-laminates, one face of each being a similar adherable transparent interlayer material and the other face of each being dissimilar rigid transparent sheet material, and contacting said faces having the similar adherable transparent materials, until the two sub-laminates have become joined to form a unitary composite. Prior to contacting the sub-laminates, one or both of the faces having the adherable materials may have a solvent or compatible transparent adhesive applied thereto.

The novel laminating technique above described represents a significant advance in the art in that it permits and completes the junction between dissimilar rigid materials such as glass and Plexiglas at a temperature as nearly as possible equal to a medium of all the temperatures at which the composite will later experience service. In this way, the interacting forces between the glass and Plexiglas are minimal and acceptable. The bond to the glass and Plexiglas is optimized because in the first stage of laminating, the glass and Plexiglas faces are each separately bonded to the appropriate type of material, normally a polyvinyl butyrate under conditions of temperature, pressure and surface preparation which are optimum for adhesion to each. The interior faces, being of identical or similar materials, are then readily joined at moderately elevated temperatures or at room temperature. The only high temperatures employed in the overall process are those utilized in sub-laminating. However, since the sub-laminates are normally permitted to cool before the final joining, the resulting composite not only has the best possible bonding of the interlayer to the hard facing materials, but also has little or no tendency to bow, since at no time is it necessary to subject the two dissimilar facing materials to high temperatures during the joining process.

Accordingly, it is a principle object of my invention to provide a novel two-step laminating process for joining disimilar hard transparent materials.

Another object of this invention is to provide a process of joining dissimilar hard transparent materials without the use of elevated temperatures in the final joining to thereby avoid bowing and the stresses associated therewith.

It is also an object of this invention to laminate dissimilar materials under conditions of temperature, pressure and surface preparation which are optimum for adhesion to each.

These and other objects and advantages of this invention will become apparent from the more detailed description which follows.

DESCRIPTION OF THE PREFERRED EMBODIMENTS OF THE INVENTION

The bonding of a thermoplastic interlayer material to the glass or to the Plexiglas is accomplished utilizing known pressures, temperatures and surface preparation techniques. These techniques are already familiar to those skilled in the art and hence need not be further described here. The use of high temperatures for sub-laminating does not affect final joining and hence there is a freedom of selection of sub-laminating conditions based solely on the nature of the two materials being sub-laminated.

The joining of the two sub-laminates may be carried out in any one of several ways. In one way, the sub-laminates may be joined by the application of temperature and pressure. In general, the higher the pressure, the lower the joining temperature. Thus, at about 100° F., the joining pressure is about 200–250 p.s.i. If the pressure is raised to 1000 p.s.i., the joining temperature may be on the order of room temperature. Yet other ways of joining sub-laminates are to coat the faces of the thermoplastic material on each sub-laminate with a solvent material such as methanol or transparent adhesives compatible with each thermoplastic facing. Thereafter, the two sub-laminates may be joined together by the application of only slight pressures or by vacuum at room temperature. In any event, it can be seen that the joining of the sub-laminates is accomplished in all cases at considerably lower temperature than may be employed in one-step laminating.

The following example is presented solely to illustrate the invention and should not be regarded as limiting in any way.

EXAMPLE

A sheet of polyvinyl butyral (commercial type DBS plasticized) is bonded at elevated temperature to the surface of a sheet of stretched Plexiglas. To a sheet of chemically tempered glass is bonded a similar polyvinyl butyral material (3GH plasticized vinyl) at elevated temperature. After cooling, the polyvinyl butyral faces of the resulting sub-laminates are contacted with heat and pressure. Normally, the surface of the vinyl material is textured to facilitate air removal. Heat and pressure are then applied to the assembly at approximately 100° F. and 200–250 p.s.i. to accomplish the bonding. Further unpressurized aging at the bonding temperature strengthens the bond.

Alternatively, in lieu of the application of heat and pressure, the polyvinyl butyral surface of the sub-laminates may be sprayed with methanol or transparent compatible adhesives at room temperature. Thereafter, the sub-laminates are assembled and sealed. The assembly is subjected to a vacuum at about 50° F. until the desired joint is obtained.

While the foregoing discussion has been with particular reference to the joining of stretched Plexiglas to glass, it will be undertood that the present invention is applicable to the joining of any two transparent materials which are dissimilar chemically, in modulus and/or in thermal expansion properties. For example, the present invention envisions the joinder of a rigid transparent polyester sheet to Plexiglas or to glass. The invention envisions the use of all of the various types of glass, although chemically tempered glass is used for most applications. Likewise, the interlayer material may be not only polyvinyl butyral but any of the other transparent interlayer materials familiar to those skilled in the art.

Thus, it can be seen that the present invention represents a significant advance in the development of composite transparencies. By the present invention, the joined is accomplished under the most advantageous conditions, both for sealing purposes and also with a minimum of stressing caused by the restraint of a bowed material.

Having fully described the invention, it is intended that it be limited only by the lawful scope of the appended claims.

I claim:

1. A method of laminating which comprises taking two sub-laminates, one face of a first sub-laminate being composed of an adherable transparent interlayer material, one face of the other sub-laminate being composed of the same interlayer material as that first-mentioned, the opposite faces of said sub-laminates being composed of rigid transparent materials which as between the two sub-laminates differ substantially one from the other in coefficients of thermal expansion, one of said rigid transparent materials being glass, the other of said rigid transparent materials being plastic; and contacting the faces of said sub-laminates which are composed of said interlayer material until the two sub-laminates are adherently joined.

2. The method of claim 1 wherein the sub-laminates are each individually formed by bonding the adherable transparent interlayer material to the rigid transparent material at the pressure and temperature optimal for bonding the said adherable transparent interlayer material to the said rigid transparent material, and then permitting said sub-laminates to cool.

3. The method of claim 2 wherein the said adherable transparent interlayer material is polyvinyl butyral, one of the said rigid transparent materials being chemically tempered glass and the other of said rigid transparent materials being polymethylmethacrylate.

4. The method of claim 1 wherein the contacted sub-laminates are adherably joined at a temperature which is less than the temperature required for bonding the said adherable transparent interlayer material to the said rigid transparent materials.

5. The method of claim 4 wherein there is applied to the faces of the two sub-laminates which are composed of the said adherable transparent interlayer material prior to contacting a solvent for said interlayer material, and the said faces composed of the said interlayer material are then contacted at about room temperature until the two sub-laminates are adherably joined.

6. The method of claim 4 wherein a transparent adhesive compatible with said interlayer material is applied to at least one of the faces composed of said interlayer material prior to contacting the sub-laminates.

7. The method of claim 4 wherein the sub-laminates are adherably joined at a temperature of from about 100° F. to room temperature, and at a pressure of about 200 p.s.i. to 1000 p.s.i.

8. The method of claim 1 wherein the contacted sub-laminates are joined at a temperature approximately equal to the median of the range of temperatures to which the resultant composite will be exposed in service.

9. The method of claim 8 wherein the said interlayer material is polyvinyl butyral, one of the said rigid transparent materials being chemically tempered glass and the other polymethylmethacrylate.

10. The method of claim 2 wherein the contacted sublaminates are adherably joined at a temperature approximately equal to the median of the range of temperatures to which the resultant composite will be exposed in service.

11. The method of claim 10 wherein the said interlayer material is polyvinyl butyral, one of said rigid transparent materials being chemically tempered glass and the other polymethylmethacrylate.

References Cited

UNITED STATES PATENTS

| | | | |
|---|---|---|---|
| 2,069,425 | 2/1937 | Shoemaker | 156—99 |
| 2,113,767 | 4/1938 | Paggi | 156—106 |
| 2,120,628 | 6/1938 | Reid | 161—199 |
| 2,180,625 | 11/1939 | Bishop | 156—99 |
| 2,464,826 | 3/1949 | Neher et al. | 161—99 |
| 3,178,334 | 4/1965 | Bragan | 161—199 |
| 3,310,458 | 3/1967 | Mattimoe et al. | 161—248 |

FOREIGN PATENTS 655,540   1/1963   Canada.

REUBEN EPSTEIN, Primary Examiner

U.S Cl. X.R.

156—99, 307; 161—199, 248